July 2, 1963          W. G. HESPENHEIDE          3,096,271
DATA DISPLAY DEVICE

Filed Nov. 26, 1958                              2 Sheets-Sheet 1

INVENTOR.
WILBUR G. HESPENHEIDE
BY
Henry W. Kaufmann
AGENT

July 2, 1963 W. G. HESPENHEIDE 3,096,271
DATA DISPLAY DEVICE
Filed Nov. 26, 1958 2 Sheets-Sheet 2
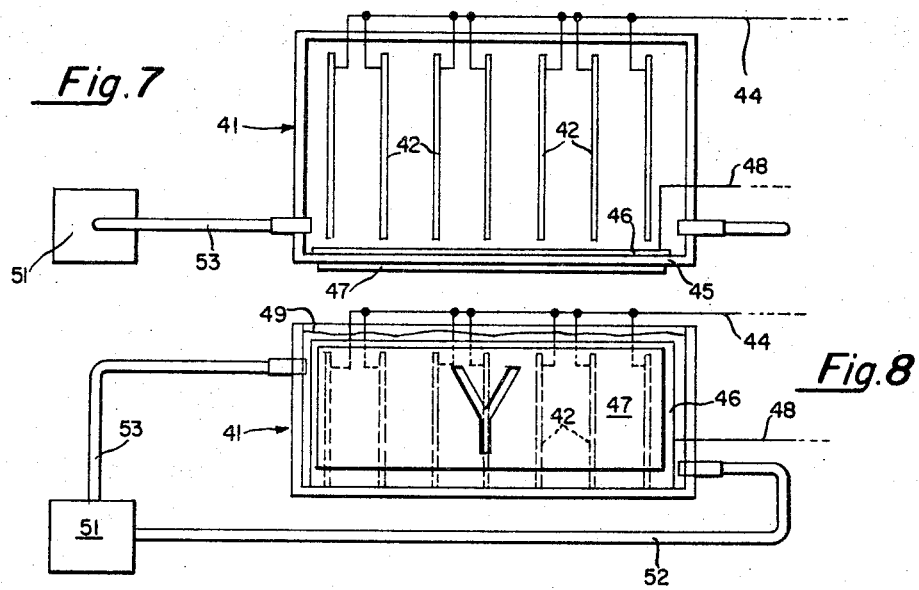
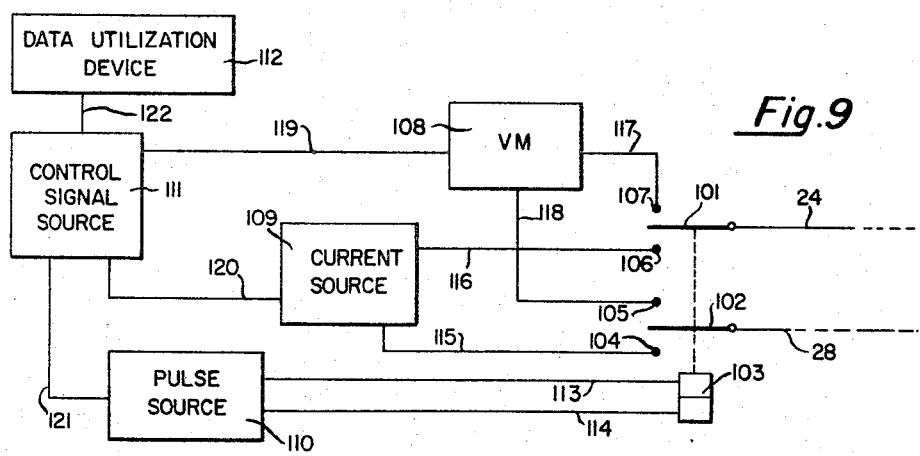
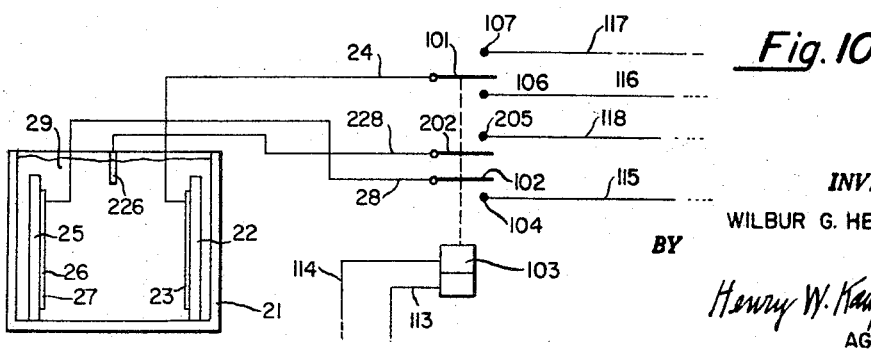
INVENTOR.
WILBUR G. HESPENHEIDE
BY Henry W. Kaufmann
AGENT

United States Patent Office 3,096,271
Patented July 2, 1963

---

3,096,271
DATA DISPLAY DEVICE
Wilbur G. Hespenheide, Malvern, Pa., assignor to Burroughs Corporation, Detroit, Mich., a corporation of Michigan
Filed Nov. 26, 1958, Ser. No. 776,481
13 Claims. (Cl. 204—267)

This invention relates to data display devices, and more particularly to electrically operated data display devices.

The flexibility of a human being renders it sometimes desirable that an output of an electrical computing or data-processing system be fed into a human being for interpretation. Elaborate high-speed printing devices are available for such purpose; alternative very simple devices also so used are simple lamp indicators.

Where a moderately complex message (as, for example, a number of four decimal digits) is to be made available for easy observation from a fairly large area and wide azimuthal angle, the high-speed printer is usually needlessly complex and expensive; and the simple lamp display becomes slightly burdensome to decode, and requires large lamps (especially in high intensity ambient light) and continued application of power for continued display.

My invention is aimed particularly at providing displays of information in any desired size, capable of being viewed by ambient light, continuing visible even after termination of the energy application which produces them, and of unusual cheapness and reliability. My invention also offers the advantage that the condition of the display (i.e., the data currently being displayed) may be determined by examining the voltage across the device. Other advantages consequent upon the practice of my invention will appear in the description and specifications hereinafter.

Electrodeposition of materials from suspension or solution is old and well known. It has been proposed to employ electroplating upon a mirror to control the reflection of light over a path (Jenks, U.S. Reissue Patent 16,733) for tele-photography, or facsimile. It has also been proposed to use a matrix or screen of cathodes insulated from each other and separately controlled to produce, by plating upon selected cathodes, an image or picture (Steiner, Britsh Patent 241,646 complete accepted October 26, 1925). This latter scheme requires a fairly elaborate switching system if any one of ten decimal digits is to be reproduced.

My own invention comprises broadly an electrolytic cell in which there is visible, directly or by projection, to an observer an electrode upon which there may be electrodeposited a visible coating such that the visible coating delineates a visible symbol; and by reversal of the deposition current, the visible coating may be caused to disappear, causing disappearance of the visible symbol.

My invention is illustrated by figures as here recited:

FIGS. 7 and 8 represent two views of an embodiment employing an anode consisting of a number of plane strips and a separate mask. These figures are used also to indicate the use of forced circulation of the electrodeposition liquid, although such use is not confined in application to the embodiment represented in these figures; and FIGS. 9 and 10 show schematically circuitry for utilizing certain features of my invention.

Figure 1:
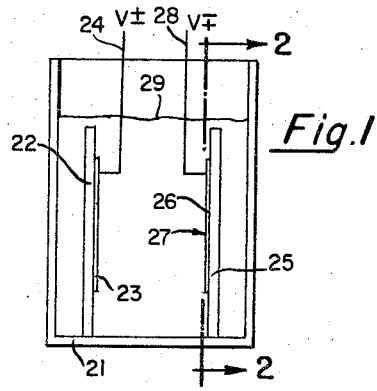
FIG. 1 represents a simple embodiment of my invention.
Figure 2:
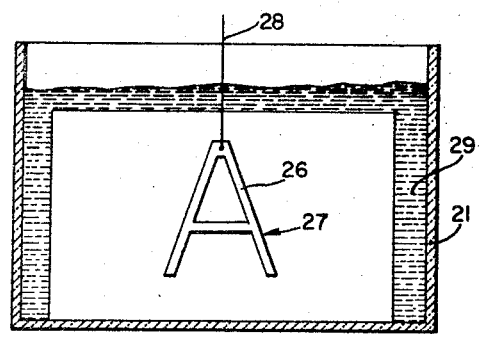
FIG. 2 represents another view of the embodiment of FIG. 1.

In FIGS. 1 and 2, 21 is a transparent-walled vessel such as a glass battery jar, containing a transparent sheet 22, which may be of glass, and which is covered with a transparent conductive coating 23 to which is connected an insulated conductor 24. Vessel 21 also contains a transparent sheet 25 on which there is a transparent conductive coating 26 applied in the shape of a symbol 27, shown in FIG. 2 as the letter A. Connection to coating 26 is made by insulated conductor 28. A suitable electrodeposition liquid 29 is in the jar in contact with both electrodes 23 and 26. The coatings 23 and 26 may be chemically or vacuum deposited thin films of inert metallic materials, such as platinum, or may be otherwise formed, e.g., by glazing the surface of glass with the thermal decomposition products of tin chloride. The liquid 29 may be any one of numerous standard plating solutions. Thus a concentration of 100 to 250 grams per liter of copper sulphate and of 40 to 100 grams per liter of sulphuric acid gives a solution suitable for depositing and removing copper. By applying a potential which renders coating 26 negative, an opaque deposit of copper may be deposited upon coating 26 forming an opaque image of the symbol 27.

This voltage may be appreciably higher than conventional plating voltages for the brief time required to produce the desired visual effect; for example, a six-volt storage battery has been found to be suitable when connected across a cell employing the copper-depositing solution described. Continued application of such voltage after the cathode has been covered with copper will produce gas evolution; but this does not occur to any troublesome extent for a period sufficient to produce a copper "strike" over the exposed cathode area. If now the circuit to coating 26 is opened, the opaque image of symbol 27 will remain indefinitely without further application of energy. The equilibrium potential between the solution 29 and the completely electrodeposited copper surface covering coating 26 will, in general, be different from the equilibrium potential between the unplated coating 26 and the solution 29.

This difference, for a copper plating bath as herein described, and a relatively insoluble coating 26 will range from a few tenths of a volt to as much as a volt, depending upon electrolyte concentration, temperature, surface condition and material of coating 26. This potential difference may be utilized in several ways. In the first place, measurement of the potential difference will indicate in what condition the coating 26 is, i.e., whether covered or uncovered. Thus data once represented by covering of the electrode 26 to display symbol 27 may be cleared from the remainder of the associated data processing apparatus, and the fact that symbol 27 is presented can be determined by sampling the potential difference between electrodes 23 and 26. Another use, not incompatible with the first, is to sample the potential difference between electrodes 23 and 26 to determine whether the process of coating (or stripping, as is to be discussed immediately hereafter) has been completed. The utility of a display device depends not only upon the possibility of causing it to present a symbol, but upon the possibility of causing the symbol once presented to vanish. This is accomplished by the operation known as electrodissolution or stripping. The potential originally applied to cause deposition of copper on the coating 26 is reversed, causing the copper deposit to be oxidized to soluble copper ions. Since specular surfaces are not so easily observed as mottled or matte surfaces, it may be desirable to insure that too mirror-like a deposit is not produced. This may be achieved from the conditions of deposition, or by depositing electrode 26, not as a continuous film delineating the symbol 27, but in some fine pattern of checkered squares or some alternative which will destroy any impression of a large mirror-like deposited surface. Alternatively, the sheet 25 may be roughened so that a similar matte effect will be produced by deposition on electrode 26. For this latter purpose, it is desirable that the index of refraction of sheet 25 be close to that of liquid 29 so that the mattte surface of 25 will not be too conspicuous in the absence of any deposit upon electrode 26.

Materials other than reduced metal may be produced and removed by electrical means. Thus, for example, a solution of 50 to 400 grams per liter of lead nitrate and 10 to 100 grams per liter of nitric acid may be used for the deposition and dissolution of opaque lead dioxide; and a solution of 25 to 400 grams per liter of manganous sulphate and 20 to 100 grams per liter of sulphuric acid may be used for the electrodeposition and dissolution of manganese dioxide. Many other reversible electrodepositions are known in the art, and any which have the requisite reversibility and produce a clearly visible deposit upon the transparent electrode 26 are suitable for use in the practice of my invention. It is not even essential that the deposit be opaque, provided only that it is of such color or refractive index as to be clearly visible when present.

Figure 3:
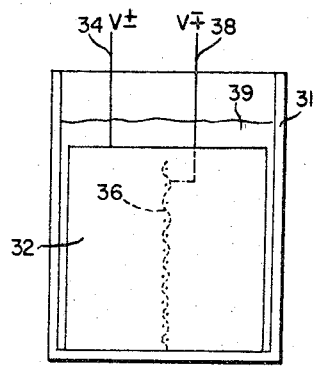
FIGS. 3 and 4 represent two views of an embodiment employing a solid anode and a mesh cathode.
Figure 4:
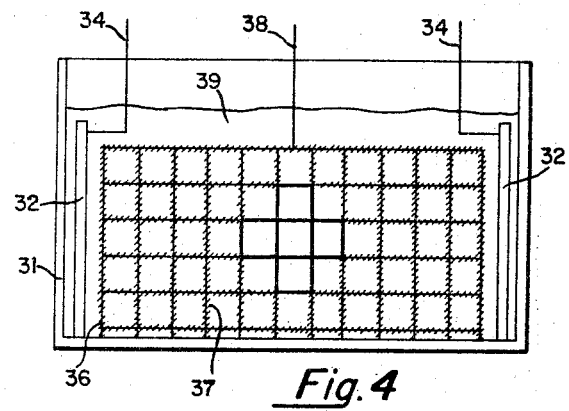

FIGS. 3 and 4 represent an embodiment of my invention in which a transparent-walled vessel 31 contains solid electrodes 32 located out of the path of view through a mesh electrode 36, connections to 32 and 36, respectively, being made by insulated conductors 34 and 38. A suitable electrolyte 39 is provided. Deposition of an opaque material upon mesh electrode 36 will make a visible change in the appearance of 36 by at least partially closing up the interstices in it with a deposit which may also differ in color or reflectivity from electrode 36. By way of illustrating an alternate means of producing a particular symbol, 36 is indicated as being itself of rectangular shape, but having those parts of it not forming part of the desired symbol protected from electrodeposition by a covering of some protecting agent or resist 37, which may be any insoluble non-conducting coating material convenient for such application to electrode 36. Electrodes 32 are of ample area to make necessary contact with liquid 39, and are located out of the path of view to electrode 36.

Figure 5:
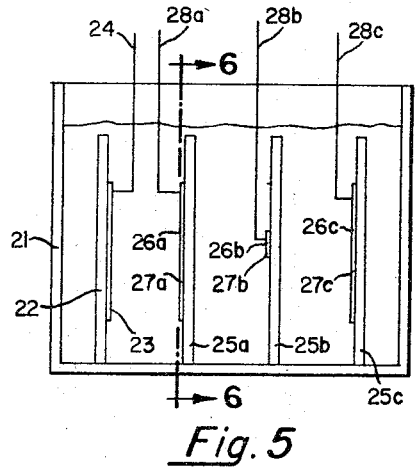
FIGS. 5 and 6 represent two views of an embodiment employing a multiplicity of transparent cathodes.
Figure 6:
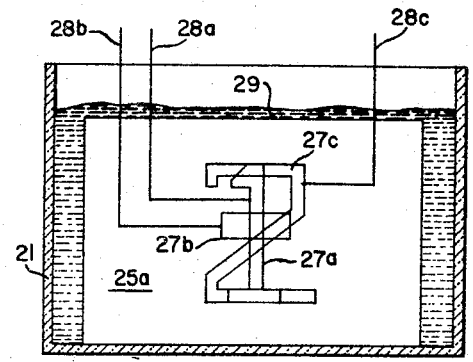

FIGS. 5 and 6 represent two views of the elements of FIGS. 1 and 2, with the sole difference that instead of a single sheet 25 with a conductive coating 26 in the shape of a symbol 27, there is provided a multiplicity of sheets 25a, 25b, 25c with respective conductive coatings 26a, 26b, 26c in the form of the respective symbols 27a, 27b, 27c, separate connections to the conductive coatings being provided by respective insulated conductors 28a, 28b, 28c as indicated. It is apparent that if no deposit is present upon any sheet 25a, b, or c, no symbol will be presented. By application of proper polarity of voltage to conductor 28a, 28b or 28c deposition from liquid 29 will produce visibly symbol 27a, 27b, or 27c respectively, according to which conductor was selected. The transparency of the coatings 26 and the sheets 25 make it possible thus to provide means for displaying any one of a number of symbols. A given symbol may be restored to its transparent condition, and a new symbol may be presented by application of the proper voltages to the correct conductors 28. Of course, where a number of alternative electrodes are to be used, it is desirable that a particular solution selected have what is known as good "throwing power," i.e., it must not be unduly sensitive to spacing or relative position of anode and cathode. While the scheme represented by FIGURES 5 and 6 has many advantages, particularly that of compactness, it may sometimes be preferable to produce a color differentiation, as well as one of form, between different symbols. For such purpose it is possible to employ several devices like the cells represented in FIGURES 1 and 2, all aligned so that there is a common visual path through all. By employing different solutions and appropriate polarities of control currents to different cells it is possible to deposit, e.g., white metals such as silver, red metals such as copper, dark deposits of lead oxide. Thus any symbols particularly requiring differentiation from one another may be presented in different colors.

It is clear that, while it is economical of current to confine the electrodeposition to areas which actually define the symbol to be displayed, it is not at all necessary to do so. The symbol may be defined by a separate mask located either within or without the vessel in such a position that opacification of the normally transparent electrode will cut off the passage of light through the mask. FIGURES 7 and 8 represent an embodiment of such kind. A transparent-walled vessel 41 is provided with an electrode 42 consisting of a number of plates parallel to the path of vision through the wall 45 of vessel 41 bearing a conductive coating 46, which connection is provided through insulated conductor 48. The plates 42 are connected with insulated conductor 44. Liquid 49 covers the electrodes as indicated. A mask 47 in the shape of a desired symbol is represented mounted externally on the wall of vessel 41; it might equally well be mounted internally. Deposition of opaque material upon conductive coating 46 will block out vision of the mask 47, causing disappearance of the symbol. Dissolution of the opaque material will permit the symbol to be seen by light transmitted through plate 45 and mask 47.

It is obviously desirable for the presentation and removal of the symbols to be effected rapidly. While increase in the current and voltage employed will increase the speed of operation, it is necessary to depend upon diffusion in the liquid as a result of applied fields to move the ions about and remedy local depletions or excesses. It is possible, and desirable in cases where maximum rapidity of operation is desired, to employ forced circulation of liquid in the vicinity of the electrodes to insure that the fluid composition in the immediate vicinity of the electrodes will remain as nearly as possible at its ideal value, or at the average for the entire bath. In the nature of things, regardless of the direction of operation, i.e., deposition or stripping, the progress of the operation will be such as will tend to drive the composition of the liquid in the immediate vicinity of the electrodes in a direction unfavorable to the further progress of the operation. Forced circulation, as indicated in FIGS. 7 and 8, will help to overcome this effect. Pump 51 promotes a continuous circulation through tubes 52 and 53 of liquid 49 across the face of electrode 46, reducing the thickness of the film of saturated or depleted liquid immediately adjacent to 46. While the use of pump 51 has been shown specifically in FIGS. 7 and 8, it is apparent that it is applicable in any of the other possible embodiments of my invention, and also that the means for providing circulation need not be specifically a pump, but that of any equivalent means.

FIGURE 9 represents an arrangement of functional circuits to embody certain of the operational advantages of my invention. The functional blocks are endowed with capacities which may be achieved in a variety of ways known in the electrical art, and may, in many cases, be performed by parts of computing or data processing apparatus which also, at other times in the operating cycle, perform other functions. In FIGURE 9, conductors 24 and 28 represent the two conductors shown in FIG. 1 as connecting to the operating electrodes of the display device. These may be replaced by the connections to any other embodiment of the display device of my invention, such as 34 and 38 of FIGURES 3 and 4. These conductors are connected to the two moving contacts 101 and 102, respectively, of a double-pole double-throw relay which is actuated by coil 103. When the coil 103 is not activated, contacts 101 and 102 rest against fixed contacts 107 and 105, respectively, thus connecting contacting voltmeter 108 by conductors 117 and 118 to conductors 24 and 28. Then voltmeter 108 will transmit over line 119 to control signal source 111 a signal conveying information whether the potential between conductors 24 and 28 is such as corresponds to the display or to the non-display of the symbol associated with the particular display unit to which 24 and 28 are connected. Control signal source 111 may then transmit this information to data utilization device 112. When the data utilization device 112 has reached such a point in its operating cycle as to render it necessary that the state of the symbol display be altered, it sends an appropriate signal over line 122 to control signal source 111 which then sends over line 120 a control signal causing current source 109 to generate current of proper polarity and magnitude to produce the required change in the state of the display unit connected to conductors 24 and 28. At the same time control signal source 111 sends a control signal over line 121 causing pulse source 110 to begin producing pulses of relatively long duration which are applied over conductors 113 and 114 to solenoid 103, causing contacts 101 and 102 to move down against terminals 106 and 104, respectively, so that the current source 109 is connected by conductors 115 and 116 to the display unit so long as pulses from pulse source 110 activate solenoid 103. During the brief intervals when current in solenoid 103 is interrupted, the voltmeter 108 is connected across conductors 24 and 28 and indicates to control signal source 111 whether the potential difference corresponds to completion of the operation being conducted by application of current from source 109. This sampling operation is repeated at intervals dependent upon the frequency of pulses from pulse source 110. Whenever the potential measured by voltmeter 108 during such a sampling period as has just been described corresponds to completion of the desired operation, control signal source 111 sends signals over line 120 to current source 109 and over line 121 to pulse source 110 causing them to stop their operation. Moving contacts 101 and 102 then remain against contacts 107 and 105, respectively, leaving the voltmeter 108 continuously connected to measure the potential existing between conductors 24 and 28. It is obvious that various modifications of this scheme of operation are possible, all making use of the relation between the state of the display device and the potential across it. It is possible to eliminate the intermittent sampling of voltage across the display cell during plating or stripping and to measure the voltage across the cell during application of current, but this is subject to some limitations in that the use of very high current densities, as may be desirable for producing the highest speed of operation, will produce some drops not significant of the state of the cell, and will render such determination of the state less accurate.

A simple contacting voltmeter of the d'Arsonval type equipped with adjustable maximum and minimum contacts may be utilized. Alternatively, since a simple meter of the d'Arsonval type, even though of high resistance, does in fact draw some measurable current, which would permit a certain amount of local action tending to alter the state of the display device, it may be preferable to provide a vacuum tube voltmeter having a very high input resistance to perform the actual measurement of the potential existing between conductors 24 and 28 or their equivalents and to provide a contacting meter in the output or indicating meter circuit of the vacuum tube voltmeter; or two separately adjustable relays may be used instead of such a meter.

If time is not of the essence, it is, of course, possible to simply apply a current of controlled amplitude and suitable direction for a time known to be sufficient to produce the desired condition of the display device, without measuring the potential across it. Likewise, the use of the display devices herein disclosed is not confined to use with any specific devices; for example, since these devices operate at potentials of a few volts, they may be used as simple convenient manually controlled visual signalling devices, the current required for their operation being applied by a simple manually operated switch; and in such an application they would have the advantages of requiring only simple wiring and retaining their state despite intermittent operations of power, and being immune to such failures as lamp burnout which affect even such simple devices as electrically lighted indicators. Also, they may conveniently be operated from low voltage storage batteries where immunity to external power failure is important. In particular, these devices lend themselves readily to the presentation of large symbols, such as might be desirable for display in industrial establishments or yards.

A discussion of the coating or stripping of copper plating may be found in "Principles of Electroplating and Electroforming," by William Blum and George B. Hogaboom, 3rd edition, 1949, McGraw-Hill, at pages 288–298. Similarly, the deposition and stripping of lead dioxide coating is discussed in the text "Electroanalytical Chemistry," by James J. Lingane, second edition, which was first available to the public on October 7, 1958, Interscience Publishers, at pages 374–5. The electrodeposition and electrodissolution of manganese dioxide plating is discussed in the Encyclopedia of Chemical Technology edited by Raymond E. Kirk and Donald F. Othmer, 1952, The Interscience Encyclopedia Inc., vol. 8 at page 748. In all use of published formulas and conditions of deposition due consideration should be given to the possibility of exceeding, for the purposes of the present invention, the currents and voltages regarded as maximum for continuing deposition where the production of a permanent mechanically durable coating is commonly the object. In other respects, the particular purpose of deposition in accordance with this invention, i.e., the production of an optical effect in a manner which may be reversed at will, may modify some of the limitations of conventional electrodeposition for more usual purposes. Thus, for example, it may be convenient (in connection with the use of embodiments such, for example, as that represented by FIGURES 5 and 6) to combine stripping and deposition by passing current between a symbol (e.g. 27a) which is to be stripped and another symbol (e.g. 27b) which is to be plated. Likewise, it may be convenient in determining the potential of a given electrode with respect to the solution to measure, not the potential between the given electrode and the electrode actually used as a solution contact for deposition and stripping, but to provide one or more auxiliary electrodes having no purpose except to serve as reference standards for determining the state of coating of the electrode used for display. In such case the simplest way of compensating for casual temperature and other variations would be to provide two electrodes, one coated and the other uncoated, as nearly identical as possible with the display electrode in these two respective states. FIGURE 10 represents such modification of the scheme represented in FIGURE 9 as is required to permit the use of the separate reference electrode. All leads and terminals have the same function as in FIGURE 9. However, relay terminal 105 of FIGURE 9 is replaced by terminal 205, which is capable of making contact with contact 202, thence through conductor 228 to reference electrode 226. Thus, when current through solenoid 103 ceases, the lead 118 to the voltmeter will be connected to reference electrode 226, which is preferably of the same material as electrode 26. The potential between electrodes 26 and 226 will then be measured, rather than the potential between electrodes 26 and 23; as in FIGURE 9. The functioning of the system is otherwise identical with that described for FIGURE 9; for this reason only those parts which differ from FIGURE 9 have been represented in FIGURE 10. Then if the display electrode shows only a small potential with respect to one or the other of the reference electrodes, it is indicated as being in approximately the same state as the electrode with respect to which it shows only a small potential. The accuracy of such a determination would, of course, be improved by any methods tending to provide uniformity of conditions affecting the reference electrodes and the display electrode. Thus forced circulation of electrolyte, by promoting greater uniformity of concentration, would tend to produce such uniformity. For optimum accuracy, it would be desirable to put the reference electrodes occasionally through the same plate-strip or strip-plate cycle through which the display electrode passes; this would insure against any long-time aging effects. However, if the surface of the display electrode itself has a sufficiently different potential with respect to the plating solution from that of the material plated, no great accuracy is necessary in determining the state of the display electrode; these refinements are mentioned rather for completeness and to teach them for possible use under some special circumstances rather than to imply that they are essential for all operation.

Unusual emphasis attaches to the observation that the basic invention here taught is capable of very many variations by those skilled in the art, without departure from my teachings herein. In general, there is taught the use of symbol delinating means, which may be, inter alia, a visible mask separate from the symbol-displaying electrode, or masking means on the electrode, or boundaries of the electrode; and the use of means for a reversible electrodeposition process, to produce a visible coating on the symbol-displaying electrode, or to remove such a coating from the symbol-displaying electrode, according to the information to be displayed.

What is claimed is:

1. A symbol display device comprising a transparent walled vessel, a plurality of electrodes each fabricated from transparent material, at least one of said electrodes having a conducting surface formed as a symbol thereon, separate conducting means connected to each electrode, an immersing liquid within said transparent walled vessel surrounding said electrodes and being capable of depositing a visible solid upon the symbol carrying electrode arranged as a cathode, upon the application of a potential differential of proper polarity between one other of said electrodes serving as an anode and the symbol carrying electrode, said visible solid being removed upon the application of a potential differential of opposite polarity between the said symbol carrying electrode, now acting as an anode and any other of said plurality of electrodes serving as a cathode.

2. A symbol display device for use in an electrodeposition bath comprising an electrode made of transparent insulating material and partly covered with electrically conductive material defining a symbol on the surface of said transparent insulating material so that electrodeposition will occur only upon the conducting portions of said electrode, said conducting portions substantially matching said transparent insulating material in color and transparency, the electrodeposited material contrasting in color and transparency with said electrode thereby constituting the means of displaying said symbol.

3. An electrodeposition symbol display apparatus comprising, a transparent walled vessel containing a bath for reversible electrodeposition of solid material, a plurality of electrodes fabricated from transparent material, said electrodes being immersed in said bath and delineated with different symbols, said electrodes being disposed substantially one behind the other, and means for displaying a discrete symbol by the selective electrodeposition on the electrode delineated with said discrete symbol.

4. A symbol display device comprising, a transparent walled vessel, an electrodeposition bath contained within said walled vessel, at least two electrodes fabricated from transparent material, each electrode bearing a different symbol, said electrodes being supported in said bath in planes substantially parallel to each other so as to be visible from outside said walled vessel, appearing as superimposed one over the other, whereby the symbols selectively and randomly rendered visible by electrodeposition, will appear to an observer to be in the same plane.

5. In a symbol display device comprising, a transparent walled vessel, at least a pair of symbol displaying electrodes fabricated from transparent material and immersed in a liquid of such nature that application of a first potential difference between the first of said electrode pair, electrically acting as an anode and the second of said electrode pair acting as a cathode, will produce a defined first visible deposit on said first electrode, and application of a second potential difference between said first electrode, electrically acting as a cathode and said second electrode acting as an anode, will remove said first visible deposit from said first electrode, means for applying said first potential difference between said first electrode serving as an anode and the second electrode of said electrode pair serving as a cathode, so as to form said first visible deposit on said first electrode, and means for applying said second potential difference, as required, between the second electrode serving as the anode and the first electrode serving as a cathode, so as to form a defined second visual deposit on said second electrode, while simultaneously removing the first visible deposit from said first electrode.

6. A symbol display device comprising, a transparent walled vessel, at least two electrodes fabricated from transparent material, an electrolyte within said walled vessel containing metallic ions, said electrodes being immersed in said electrolyte, delineating means for defining a symbol on the surface of at least one of said electrodes, means for applying a predetermined potential difference between said symbol bearing electrode and one other of said electrodes to enable deposition of a metallic coating when said symbol bearing electrode acts a a cathode and said one other electrode serves as an anode, and removal thereof when said symbol bearing electrode acts as an anode, and said one other electrode serves as a cathode, thereby to display or render invisible the defined symbol respectively.

7. A symbol display device comprising, a transparent vessel containing a bath for reversible electrodeposition of solid material, an electrode array supported in said bath, each electrode being of transparent material, at least one electrode having a preformed symbol thereon of transparent electrically conductive material, a source of potential adapted to be selectively connected to the electrodes of said array, means for connecting a preselected symbol bearing electrode of said array to said potential source respectively as an anode, one other in said electrode array serving as a cathode during electrodeposition, and as a cathode during electrodissolution, any other one of said electrode array serving as an anode, whereby the symbol carried by said preselected electrode is made visible during electrodeposition by the deposition of opaque solid material thereon.

8. In an information display system, a symbol display station comprising, a containing vessel having at least one transparent wall area, an electrodeposition bath or fluid in said containing vessel, a plurality of electrodes fabricated from transparent material and supported in said bath in spaced array parallel to said transparent wall, substantially one behind the other, each electrode having exposed conductive transparent surfaces of predetermined pattern to delineate a symbol, a source of potential adapted to be connected to said electrodes, connecting means for connecting a preselected electrode with said potential source in such manner that said preselected electrode serves as a cathode during electrodeposition, any one other of said plurality of electrodes serving as an anode, to thereby electrodeposit a visible light-impeding deposit on said exposed conductive surface of said preselected electrode, said connecting means at an arbitrarily later time connecting the said preselected electrode with said potential source so that the preselected electrode now serves as an anode, any one of said plurality of electrodes serving as a cathode, the said visible light-impeding deposit being returned to said electrodeposition bath.

9. A symbol display device according to claim 1 comprising, means for determining the magnitude of the potential difference between said symbol-carrying electrode, and any other one of said electrodes selected from said plurality of electrodes for determining the instantaneous state of display of said symbol-carrying electrode.

10. A symbol display device according to claim 5 comprising sampling means connected between said electrode pair for periodically determining the potential difference between said electrodes for the purpose of indicating the state of completion of electrodeposition and electrodissolution respectively.

11. A symbol display device according to claim 5 comprising means for determining the magnitude of the potential between said electrode pair for determining the instaneous display state of said device for delivery to data processing means for processing said display state information.

12. A symbol display device according to claim 1 comprising a reference electrode selected from said plurality of electrodes, said reference electrode being maintained in a known state of surface electrodeposition for utilization as a potential reference standard for comparison with the potential of said symbol-carrying electrode.

13. In an information display system according to claim 8, a second symbol display station in visual alignment with said first symbol display station in which the containing vessel of said second station is provided with a second electro-deposition bath which provides deposited material of a second color distinct from that deposited by the first electro-deposition bath.

References Cited in the file of this patent

UNITED STATES PATENTS

| | | | |
|---|---|---|---|
| Re. 16,733 | Jenks | Sept. 6, | 1927 |
| 707,306 | Daly | Aug. 19, | 1902 |
| 743,522 | Keppler | Nov. 10, | 1903 |
| 774,976 | Blower | Nov. 15, | 1904 |
| 1,068,774 | Hutchison | July 29, | 1913 |
| 1,148,936 | Stille | Aug. 3, | 1915 |
| 1,416,929 | Bailey | May 23, | 1922 |
| 1,525,107 | Spencer | Feb. 3, | 1925 |
| 1,963,496 | Land | June 19, | 1934 |
| 2,641,672 | Parrish | May 8, | 1950 |
| 2,699,424 | Nieter | Jan. 11, | 1955 |
| 2,722,511 | Butler et al. | Nov. 1, | 1955 |

FOREIGN PATENTS

| | | | |
|---|---|---|---|
| 241,636 | Great Britain | Oct. 26, | 1925 |
| 724,086 | Great Britain | Feb. 16, | 1955 |

OTHER REFERENCES

Bell System Tech. Journal, volume 35, March 1956, page 336.